US006691805B2

(12) United States Patent
Thaemlitz

(10) Patent No.: US 6,691,805 B2
(45) Date of Patent: Feb. 17, 2004

(54) ELECTRICALLY CONDUCTIVE OIL-BASED MUD

(75) Inventor: Carl Joseph Thaemlitz, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 206 days.

(21) Appl. No.: 09/939,990

(22) Filed: Aug. 27, 2001

(65) Prior Publication Data

US 2003/0070843 A1 Apr. 17, 2003

(51) Int. Cl.$^7$ .................................................. C09K 7/02
(52) U.S. Cl. ........................ 175/65; 166/254.2; 507/103
(58) Field of Search ....................... 175/65; 166/250.01, 166/254.2; 507/100, 103, 110, 114

(56) References Cited

U.S. PATENT DOCUMENTS

| | | | |
|---|---|---|---|
| 2,417,850 A | 3/1947 | Winslow ..................... 175/320 |
| 2,739,120 A | 3/1956 | Fischer ........................ 252/8.5 |
| 3,047,507 A | 7/1962 | Winslow ..................... 252/75 |
| 3,133,592 A | 5/1964 | Tomberlin ................... 166/60 |
| 3,294,169 A | 12/1966 | O'Brien ....................... 166/46 |
| 3,294,184 A | 12/1966 | O'Brien ....................... 175/65 |
| 3,696,866 A | 10/1972 | Dryden ....................... 166/248 |
| 3,880,764 A | 4/1975 | Donham ..................... 175/65 |
| 4,140,180 A | 2/1979 | Bridges et al. ............. 166/248 |
| 4,557,142 A | 12/1985 | Hensley et al. ............... 73/153 |
| 4,662,438 A | 5/1987 | Taflove et al. .............. 166/245 |
| 4,772,407 A | 9/1988 | Carlson ........................ 252/74 |
| 5,109,922 A | 5/1992 | Joseph ....................... 166/65.1 |
| 5,122,293 A | 6/1992 | Rekers et al. ................. 252/75 |
| 5,282,508 A | 2/1994 | Ellingsen et al. ........... 166/249 |
| 5,595,680 A | 1/1997 | Bryant et al. ................. 252/77 |
| 5,604,440 A | 2/1997 | Tomikawa et al. .......... 324/663 |
| 5,872,443 A | 2/1999 | Williamson .................. 320/21 |
| 5,977,031 A | 11/1999 | Patel ........................... 507/138 |
| 6,006,831 A | 12/1999 | Schlemmer et al. ... 166/250.01 |
| 6,022,833 A | 2/2000 | Mueller et al. ............. 507/203 |
| 6,029,755 A | 2/2000 | Patel ........................... 175/50 |
| 6,328,102 B1 | 12/2001 | Dean .......................... 166/248 |
| 2002/0130429 A1 | 9/2002 | Endo et al.. .................. 264/13 |

FOREIGN PATENT DOCUMENTS

| | | | |
|---|---|---|---|
| EP | 0 381 198 A1 | 8/1990 | ............ F16F/13/00 |
| WO | WO 00/41480 | 7/2000 | |

OTHER PUBLICATIONS

Paul Huibers, Surfactant Self–Assembly, Kinetics and Thermodynamics of Micellar and Microemulsion Systems (1996), University of Florida PhD, chapter 3.*

* cited by examiner

*Primary Examiner*—David Bagnell
*Assistant Examiner*—Jennifer R. Dougherty
(74) *Attorney, Agent, or Firm*—Craig W. Roddy; Karen B. Tripp

(57) ABSTRACT

An electrically conductive oil mud meeting the fluid requirements for resistive logging tools and a method for preparing such mud is disclosed. The fluid has been optimized to deliver performance in a manner as similar to that of a traditional invert emulsion drilling fluid as is practical while still maintaining the required electrical conductivity for resistivity-based logging tools. This electrically conductive oil-based mud comprises a polar synthetic ester base and complimentary ester surfactants, one being more oil soluble, the other being more water soluble. The surfactants interact synergistically to provide dense packing of micelles at the palisade layer. This fluid is oil-wetting to solids, and in general behaves like a traditional oil mud.

17 Claims, No Drawings

(12) United States Patent

ELECTRICALLY CONDUCTIVE OIL-BASED MUD

BACKGROUND OF THE INVENTION

1. Field of the Invention

The present invention relates to oil-based muds or fluids for use in drilling wellbores in subterranean formations. More particularly, the invention relates to oil-based muds suitable or compatible for use with resistivity imaging of the wellbore or the formation.

2. Description of Relevant Art

In the oil and gas industry, there are generally three primary or commonly used techniques for imaging of wellbores. These three techniques are: acoustic imaging, azimuthal density neutron imaging, and resistivity imaging. Of the three, resistivity imaging is often preferred for its relative simplicity of operation, rapid acquisition of real-time data, and highly accurate images of geological features.

Resistivity imaging techniques are based on measurements of the electrical resistance of the formation exposed to the wellbore. Tools based on this technique, such as Halliburton's Electro-Micro-Imager™ (EMI), available from Halliburton Energy Services, Inc. in Houston, Tex., typically apply an alternating current of approximately one volt at an operating frequency of about 15 kHz. The current is applied to the formation through a series of pads that are pressed firmly against the wellbore. After passing into the formation, the signal is conducted back to a detector on the tool by the wellbore fluid.

The electrical conductivity of a wellbore fluid directly affects the quality of the resolved image. If the fluid is overly conductive, such as a concentrated salt brine, a poorer image may result due to an electrical short preventing good electrical penetration into the formation. If the fluid behaves as a dielectric or a capacitor, the lack of a signal or an unfavorable signal-to-noise ratio may prevent satisfactory image resolution. Such dielectric behavior is exhibited by a traditional oil-based mud. The continuous hydrocarbon phase of an oil mud is an electrical insulator, causing the oil mud to behave in a dielectric manner. Thus, resistance imaging devices are typically used when the wellbore contains an aqueous fluid, or when aqueous-based drilling fluids are used to drill the wellbore.

In resistance logging applications, the EMI tool is serviceable in fluids having resistances of about 2000 to about 0.2 ohm-m. Preferably, the fluid has a minimum conductivity in the range of about 1–10 ms/m (millisiemens-per-meter), which is equivalent to about 10- to about 100 μs/cm. These values are represented in terms of resistivity by about 1000- to about 100 ohm-m. The serviceability of any conductive fluid is dependent on its lack of dielectric (electrically insulating) properties. A fluid that exhibits low conductivity and no dielectric or capacitance properties should, at least theoretically, be capable of yielding or facilitating good wellbore images, owing to its favorable signal-to-noise ratio.

U.S. Pat. No. 6,006,831, issued Dec. 28, 1999 and assigned to Schlumberger Technology Corp., discloses additives comprising certain metallic and non-metallic particles and fibrous materials said to enhance the images obtainable with electrical logging techniques when added to certain wellbore fluids. The wellbore fluids are either based on traditional invert emulsion drilling fluid technology or are 100% oil fluids. These additives have an aspect ratio of two or greater. They are said to improve electric logging results by bridging solely among themselves, by linking the emulsified brine droplets, or by a combination of these two mechanisms. In the patent, most of the treated fluids were said to display electrical stabilities well above 100 volts; the lowest electrical stabilities were in the 15–20 volt range. However, these fluids showed relatively high resistivities, making them unfavorable for most drilling or well service fluid applications.

International patent application publication number WO 00/41480, published Jul. 20, 2000 and assigned to Sofitech N. V., Schlumberger Canada Limited, and Dowell Schlumberger, discloses invert emulsion drilling fluids containing carbon black particles having preferred surface areas of 500–1500 m$^2$/g at concentrations of 0.2–10% by volume. Although, traditional calcium fatty soap-related technologies used to prepare invert emulsions are said to tend to modify the surface of carbon black and render it nonconductive in such applications, monovalent surfactants, such as sodium ion fatty acid soaps, or nonionic surfactants, used to prepare invert emulsions, are said not to modify the carbon black. Rather, the carbon black particles in such emulsions are said to be free to associate such that conductivity through the fluid is established. Examples of surfactant chemistries said to be preferred for the invention are diethanolamides, alcohol alkoxylates, copolymers, fatty acids, phosphate esters, and phosphonates. The internal brine phase may contain monovalent salts and any materials that complex with or precipitate polyvalent ions. Conductivity near the 100 μs/cm level is cited in an example. Applications claimed include drilling, logging, measurement-while-drilling (MWD), and logging-while-drilling (LWD).

Notwithstanding laboratory results reported in the WO/00/41480 publication, fluids based on traditional albeit monovalent or nonionic surfactant invert oil emulsions with electrically conductive properties imparted to them by conductive particle additives are still expected to possess traditional invert emulsion drilling fluid properties. Such fluids will not necessarily have the electrically conductive properties of a continuous aqueous phase. The dielectric (electrically insulating) properties of the oil will undoubtedly have an effect in the field on the conductivity of the particles, causing such fluids to display conductivity having dielectric or capacitance properties, which in turn can result in the detected logging current having a poor signal-to-noise ratio. Even where conductive properties seem favorable in lab tests, any source of multivalent cations in the actual wellbore, such as may be caused by lime or salt water flows in the field, can affect the conductive properties and result in a poor signal to noise ratio. Even without disruption of conductivity in the whole drilling fluid, filtrate that invades the formation may exhibit little or no conductivity.

U.S. Pat. No. 6,029,755, issued Feb. 29, 2000 and assigned to M-I L.L.C., discloses a fluid composition of an oleaginous fluid, an aqueous solution containing electrolytic salts, an emulsifier, and a water-soluble alcohol said to be useful for resistivity imaging. However, the fluid prepared according to the patent is actually not believed to be a true invert emulsion oil mud. The oleaginous fluid is said to preferably be oil-soluble glycols, butyl ethers of propylene glycols, or a mixture of these with synthetic, mineral, vegetable, or silicone oils. These glycol-based chemistries represent the well-known class of materials known as mutual solvents. The aqueous solution is said to contain any of the following electrolytic salts: chlorides of sodium, potassium, ammonium, magnesium, and calcium; bromides of sodium and calcium; acetates of sodium and potassium;

or citrate of sodium. The emulsifier is said to consist of tall oil fatty acid (TOFA), oxidized TOFA, surfactants, phosphate esters, amidoamines, or imidazolines. The water-soluble alcohol component is said to consist of ethylene glycols, propylene glycols, ethylene oxide/propylene oxide (EO/PO) copolymers, or butylene glycol (1,4-butane diol). Supplemental additives described include clay-based or polymeric gelling agents and corrosion inhibitors. Conductivity in such fluid is believed to be occurring through the aqueous phase. Because this fluid is not believed to be a true invert emulsion oil mud, it is not believed capable of preventing shale dispersion or inhibition in the manner of a traditional invert emulsion drilling fluid. Further, mutual solvents are well known to have detrimental effects on polymeric components of rig equipment.

There continues to be a need for new and improved oil-based invert emulsion drilling fluids with electrical conductive properties suitable for use with resistivity logging.

SUMMARY OF THE INVENTION

The present invention provides oil-based drilling fluids capable of imparting electrical conductivity such that conventional resistance-based wellbore logging tools can function within the fluid. The fluid is oil-wetting to solids, and in general behaves like a traditional oil mud. This electrically conductive oil-based mud (ECOM) of the invention is preferably comprised of a sorbitan ester derivative surfactant (or similar compound), an ethoxylated sorbitan ester derivative surfactant (or similar compound), and a synthetic ester base oil with a polar chemical structure. The surfactants are complimentary; that is, one is more water soluble than the other and one is more oil soluble than the other. The complimentary surfactants interact and arrange in a staggered formation resulting in closer structural packing density, at least in the palisade layer, than is achievable with either surfactant alone.

The present invention further provides a method for resistivity imaging a formation while drilling a wellbore in said formation with an ECOM of the present invention.

DETAILED DESCRIPTION OF PREFERRED EMBODIMENTS

The present invention provides an electrically conductive oil-based mud or fluid and a method for resistivity imaging of a wellbore during drilling of the wellbore.

The electrically conductive oil-based mud (ECOM) is preferably comprised of a sorbitan ester derivative, an ethoxylated sorbitan ester derivative, and a polar, synthetic ester base oil.

The sorbitan ester derivative is selected from the well-known class of nonionic surfactants having the commercially recognized name SPAN®, available from ICI Americas Inc. in Wilmington, Del., or a fatty surfactant ester similar in chemical structure or behavior. Some of the most common SPAN® chemistries are SPAN® 20 (sorbitan monolaurate, HLB=8.6), SPAN® 40 (sorbitan palmitate, HLB=6.7), and SPAN® 80 (sorbitan monooleate, HLB=4.3). (HLB is Hydrophilic Lipophilic Balance.) The ethoxylated sorbitan ester derivative is selected from the class of surfactants having the commercially recognized name TWEEN®, available from ICI Americas, Inc. in Wilmington, Del., or an ethoxylated fatty surfactant ester similar in chemical structure or behavior. References to SPAN®(s) and TWEEN®(s) herein, unless indicated to the contrary, shall be understood to include not only known commercial SPAN® and TWEEN® compounds but other similar surfactants as well. For example, SPAN® 20 has the formula:

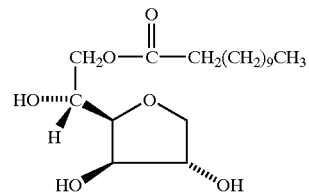

and TWEEN® 20 has the formula:

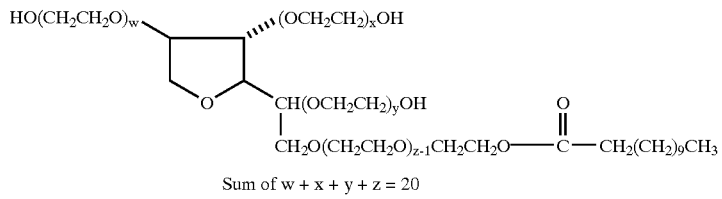

Sum of w + x + y + z = 20

Disponil SML™ (like SPAN® 20) and RS1100™ (similar to or related to TWEEN®20 but more water soluble), available from Halliburton Energy Services, Inc. in Houston, Tex. and Henkel in Germany are most preferred for the ECOMs of the invention.

When applied together in a single application of the present invention, the SPAN® and TWEEN® (or similar) surfactant chemistries interact synergistically to create micelles having considerably greater concentrations of surfactant molecules in their palisade layers (interfaces) than would be obtained if either chemistry were applied alone. In the case of invert emulsions, the aqueous micelles contain more of the molecular structure of the TWEEN®s, while the hydrocarbon phase contains more of the complimentary SPAN®s. This "staggered," even zipper-like, or complimentary arrangement, of the surfactant molecules allows for a close structural packing density, which causes the adsorbed surfactant film at the palisade layer to be somewhat rigid. Selecting the combination of these complimentary surfactants in a ratio such that some staggered arrangement occurs at the palisade layer is a key component in preparing an oil-based fluid that exhibits electrical conductivity over a broad temperature range. For example, an ECOM of the invention may comprise about 40 lb/bbl RS1100™, about 8 lb/bbl Disponil SML™ and about 4 lb/bbl EZ MUL® NTE. EZ MUL®NTE is an emulsifier available from Halliburton Energy Services, Inc. in Houston, Tex.

Although complimentary surfactant pairs, such as for example, TWEEN®20 and SPAN® 20, (one being more soluble in water, the other being more soluble in oil), are preferred, additional or alternative surfactants may be used, provided that the surfactants allow for or provide the synergy of closer structural packing density of the surfactant molecules in the palisade layer as seen with complimentary surfactant pairs.

A preferred polar synthetic ester base oil for an ECOM of the invention is a low viscosity ester such as PETROFREE®LV, available from Halliburton Energy Systems, Inc. in Houston, Tex. PETROFREE®LV, is a monocarboxylic acid ester of a $C_2$ to $C_{12}$ manufactured alkanol. The polar ester structure of the base fluid is believed to play a significant role in the behavior of the surfactants in solution. Low viscosity ester base oil, such as PETROFREE®LV, also allows for the preparation of a lower viscosity drilling fluid having greater solids tolerance.

The internal brine phase of the ECOM of the present invention may comprise or be based on any salt commonly used in preparing invert emulsion drilling fluids. A calcium chloride brine containing about 30 percent by weight of calcium chloride salt was used for example in most of the experiments described below. Other necessary or preferred fluid components for the ECOM of the invention will also be described below. A typical ECOM example mud formulation of the invention for example would comprise invert emulsions of 90:10 ester:$CaCl_2$ in the continuous oil phase, weighted up to about 13 lb/gal.

An ECOM of the invention may be made by preparing an invert emulsion with an ester base oil, preferably PETROFREE®LV, and an emulsifier, preferably EZ MUL®NTE, in the traditional manner. To this invert emulsion is added a TWEEN® or similar surfactant, resulting in a somewhat "flipped" emulsion, which exhibits water-external properties of electrical conductivity and increased viscosity while still maintaining solids in a mostly oil-wetted state. To this fluid is then added a SPAN® or similar surfactant, resulting in a re-inversion of the emulsion, returning the fluid to a state having desirable rheological properties while maintaining adequate electrical conductivity.

This order of addition of surfactant to base oil is believed to play a significant role in electrical conductive properties of the fluid. The rheological and electrical properties of fluids prepared with other orders of addition are not believed to be as predictable as with the preferred order. However, an equilibrium of fluids prepared with other orders of additives, over an extended period of time, may occur with high temperature aging that occasionally produces ECOMs having desirable properties.

In one embodiment of the invention, a fluid loss control agent or an additional invert emulsifier such as oleic acid may be added to the fluid after the addition of the SPAN® or similar surfactant, to improve the fluid loss properties of the fluid. Over-treatment, however, should be avoided as it may render the fluid nonconductive.

Most high-temperature, high-pressure (HTHP) fluid loss test filtrates of preferred oil-based drilling fluids generally appear as homogeneous fluids. Such a homogeneous appearance in a traditional oil-based fluid's filtrate indicates an efficient membrane has been established at the filter cake that prevents almost any aqueous phase from being present in the filtrate. To determine whether the ECOMs of the invention allow or prevent mimicking of the traditional mechanism of invert emulsion fluid loss control, the concentration of aqueous phase within the filtrate may be determined. The quantity of water in the filtrate of a traditional invert emulsion drilling fluid may be only a few-hundred parts-per-million (or less) as detected by the Karl Fisher method.

A Karl Fisher analysis of two filtrates of ECOM's of the invention were conducted. Table 1 contains the ECOM formulations and their filtrate analyses.

TABLE 1

Water Present in ECOM Filtrates (Karl Fisher Method)

| | Fluid Formulations | |
|---|---|---|
| | A | B |
| PETROFREE ® LV, bbl | 0.566 | 0.566 |
| 30% $CaCl_2$ brine, bbl | 0.157 | 0.157 |
| EZ MUL ® NTE, lb/bbl | 8 | — |
| DURATONE ® HT, lb/bbl | 2 | 2 |
| GELTONE ® II, lb/bbl | 2 | 2 |
| Lime, lb/bbl | 0.5 | 0.5 |
| RS1100 ™, lb/bbl | 50 | 50 |
| Disponil SML ™, lb/bbl | 10 | 10 |
| BAROID ®, lb/bbl | 187.32 | 187.32 |
| Rev Dust, lb/bbl | 30 | 30 |
| DF-01, lb/bbl | 3 | 3 |
| DEEP-TREAT ™, lb/bbl | 1 | 1 |
| Witcamine ™ 209, lb/bbl | 2 | 2 |
| Witco's A-X180-4, lb/bbl | — | 8 |
| Karl Fisher determination of water in homogeneous HTHP Filtrate by volume | 1.9% | 2.1% |

Fluid formulations A and B exhibited significant water contents in their filtrates, suggesting that the structures of the emulsions within these fluids are not the type typically found in invert emulsion drilling muds. Furthermore, each formulation was prepared from a different 'primary' emulsifier chemistry before the fatty acid ester surfactant derivative and ethoxylated fatty acid ester surfactant derivative, RS1100™ and Disponil SML™, were added. Fluid A was prepared with the traditional DETA-based amide and fatty acids technology of EZ MUL®NTE, while fluid B was prepared with an experimental nonionic primary emulsifier, both known to make invert emulsion muds having essentially water-free filtrates. After addition of RS1100™ and Disponil SML™, the resulting emulsions yielded similar percent water contents in their filtrates. Those results indicate that consideration should preferably be given to whether the ECOMs of the invention may need a source of fluid loss control in addition to their emulsifying surfactants.

Generally, addition of traditional or synthetic fluid loss control additives, such as various iasphaltene, lignite and clay-based additives, to the ECOMs of the invention is not preferred as such additives may cause excessive fluid viscosity and/or disrupt electrical conductivity. However, addition of low concentrations of GELTONE® II™ and DURATONE® HT™ (available from Halliburton Energy Services in Houston, Tex.) (about 1 to about 2 lb/bbl of each) may promote stable electrical conductivity properties and predictable rheological properties as well as aid in fluid loss control. These beneficial properties are believed to be attributable to quaternary ammonium compounds that are contributed by each material. Similar compounds or compositions with quaternary ammonium compounds may also or alternatively be added.

A supplemental fluid treatment of fine calcium carbonate, such as BARACARB® 5, available from Halliburton Energy Services in Houston, Tex., is another fluid loss control additive that may be used with the ECOMs of the invention without detrimentally affecting the ECOM rheological or electrical conductivity properties. Although such additives may not show a significant improvement in fluid loss control when evaluated with filter paper, other porous media may show an improvement in filtration control upon the material's incorporation into the fluid.

Certain types of synthetic polymers such as dry styrene-butadiene may also or alternatively significantly improve the fluid loss control properties of the ECOM of the invention. Studies were conduced comparing the performances of ECOMs of the invention prepared with the dry polymer and with the polymer presolubilized in PETROFREE®LV, when added to the fluid before or after the addition of the SPAN® and TWEEN® type surfactants. Essentially, none of these variables had much of an effect on the ECOM's properties after hot rolling for 16 hours at 150° F. or higher.

Preferred treatment levels for the synthetic polymer are in the range of about 1 to about 6 lb/bbl. Fluids containing near the maximum concentration of dry styrene-butadiene exhibit better electrical conductivity properties. However, testing at treatment levels of synthetic polymer beginning with about 3 lb/bbl is recommended.

Traditional invert emulsion drilling fluids are believed to prevent shale dispersion by two basic mechanisms. Controlling the hydration or dehydration of the shale is one such mechanism, accomplished by osmotic diffusion of water molecules through the continuous oil phase barrier between the shale and the emulsified brine. The oil phase barrier also prevents ion exchange between the shale and the emulsified brine.

However, the fluid requirements of resistance logging tools currently in use prevent an ECOM from being capable of creating a true oil phase barrier between the shale and the emulsified brine. Some potential for cation exchange between the shale and the brine phase of the ECOM must exist. Such an exchange need not result in hydration, but may result in a modification of the ionic chemistry of the shale that may in some cases result in a 'crumbling' of the shale. This phenomenon is generally like that observed when drilling with a calcium chloride brine adjusted to have an $A_w$ equivalent to that of the shale to which it is exposed. However, an ECOM of the invention would exhibit significantly better shale stability than a calcium chloride brine, if for no other reason, than that preferably only approximately 10% of the liquid phase of an ECOM is comprised of potentially shale reactive calcium chloride brine. Further, instability may be minimized by controlling the salinity and chemical composition of the emulsified brine. The remaining 90% or so of the liquid phase of such an ECOM is preferably comprised of PETROFREE®LV and preferentially oil-wetting surfactants. Such a combination of chemistries (a low $A_w$ brine present in a small concentration along with a high concentration of inert PETROFREE®LV) results in a fluid providing the maximum shale stability possible while still maintaining electrically conductive pathways between the formation and the logging tool.

Shale stability testing was done with bentonite pellets, specifically ¼ inch Baroid compressed Bentonite Pellets, available from Halliburton Energy Services, Inc. in Houston, Tex. While testing these pellets with an oil mud is traditional, a severe cuttings stability test was conducted, since these compressed pellets generally will disintegrate rapidly after exposure to various brines. Such pellets (40 g) were added to a lab barrel of ECOM fluid of the invention and rolled overnight at 150° F. The pellets completely disintegrated in the ECOM fluid after 16 hours of hot rolling. This result is similar to what would be effected if the cuttings were exposed to a $CaCl_2$ brine.

The shale stabilizing effects of an ECOM of the invention were further studied using actual gumbo shale cuttings that were drilled with a synthetic fluid. The cuttings were washed several times with hexane, in order to remove the synthetic fluid, and dried in an oven to constant weight. Cuttings that were retained on a ¼ inch screen were kept for the dispersion study. The ECOM fluid used was a 12 lb/gal fluid having an oil:water ratio of 90:10. The cuttings (40.0 g) were added to a barrel equivalent of the ECOM and rolled at 150° F. for 16 hours. The cuttings were recovered on a series of sieves, washed with hexane, and dried to a constant weight. Table 2 presents the results of this study.

TABLE 2

ECOM Dispersion Study-Gumbo Shale Cuttings (40.0 g)

| Sieve size, mesh | Cuttings retained on sieve, g | Cuttings retained on sieve, cumulative percent |
|---|---|---|
| 35 | 7.4 | 18.5 |
| 80 | 24.9 | 80.8 |
| 140 | 5.8 | 95.3 |

These data exemplify the previously described shale dispersion properties. The reactive gumbo shale crumbled during the hot-rolling procedure; however, nearly all of it could be removed with relatively coarsely sized screens.

EXPERIMENTAL

Test samples of example ECOM formulations were prepared for laboratory testing as follows:

1. To a mixing cup add the PETROFREE®LV, GELTONE®II, DURATONE®HT, lime, DF-01 (or DF-03), and EZ MUL®NTE. Shear on a multimixer for 10 minutes.
2. Add the calcium chloride brine and shear for 10 minutes.
3. Treat with RS1100™, 1 lb/bbl of DEEP-TREAT™, and shear for 5 minutes. The fluid's viscosity will increase during this process.
4. Treat with Disponil SML™ and allow to shear for 5–10 minutes. The fluid may still appear quite viscous at this point in the procedure.
5. Add weighting material and other solids to the fluid. Shear 20–30 minutes, or until viscosity reduction is noticed.
6. Hot-roll the fluid overnight or go directly to higher temperature aging.
7. Confirm electrical conductivity using a dip-probe conductivity meter capable of measuring values as small as 1 μs/cm.

Laboratory Testing Indicated the Following General Results and Conclusions:

The preferred base fluid for the preparation of an ECOM with the surfactants RS1100™ and Disponil SML™ is PETROFREE®LV.

A 30% calcium chloride brine is used as the internal phase, although the salt concentration may be varied if an adjustment in the $A_w$ is necessary.

The O/W ratio may be varied from about 85/15 to about 95/5, although about 90/10 appears to generally yield a fluid typically having the best combination of rheological and electrical conductivity properties. The surfactants EZ MUL®NTE, RS1100™ and Disponil SML™ are included as part of the oil phase in formulation calculations. Their recommended concentrations are presented in Table 1.

Formulations are easiest to prepare when their densities are maintained at or below about 13 lb/gal. Laboratory investigations suggest that a density of about 13 lb/gal is a practical density limit for this system. Field trials may indicate higher densities are achievable while retaining desirable fluid properties.

As is the case for most ester-based fluids, the maximum recommended application temperature is approximately 250° F.

Thorough laboratory investigations of each formulation are recommended before field use.

Table 3 presents a fluid formulation used to evaluate the thermal stability and solids tolerance of the example ECOM system. Table 4 reports the example ECOM's properties after adding by volume three percent of low gravity solids and hot-rolling the sample. Table 5 shows the results of taking the fluid presented in Table 4 and aging it at 300° F. Table 5 also shows the minimal treatment required to bring the rheological properties back to a favorable state. The conductivity was somewhat diminished, yet adequate.

TABLE 3

ECOM Formulation Example 1
11 5 lb/gal base formulation, 90/10 O/W ratio

| | |
|---|---|
| PETROFREE ® LV, bbl | 0.595 |
| 30% CaCl$_2$, bbl | 0.0886 |
| EZ MUL ® NTE, lb/bbl | 7.0 |
| RS1100 ™, lb/bbl | 42.5 |
| Disponil SML ™, lb/bbl | 8.5 |
| DURATONE ® HT, lb/bbl | 2.0 |
| GELTONE ® II, lb/bbl | 2.0 |
| Lime, lb/bbl | 0.5 |
| DF-01, lb/bbl | 3.0 |
| BARACARB 5, lb/bbl | 10.0 |
| BAROID ®, lb/bbl | 192.62 |

TABLE 4

ECOM Formulation Example 1 with 30 lb/bbl Solids Contamination
30 lb/bbl of Rev Dust
Hot-Rolled at 150° F. for 64 hours

| | |
|---|---|
| Electrical Stability: | 1 V |
| Electrical Conductivity @ 120° F.: | |
| static conditions | 760 μs/cm |
| dynamic conditions | 189–249 μs/cm |
| Fann 35A @ 120° F. | |
| 600/300 rpm: | 182/111 |
| 200/100 rpm: | 79/45 |
| 6/3 rpm: | 6/4 |
| PV/YP: | 71/40 |
| 10 s/10 min gels: | 4/6 |
| HTHP @ 200° F.: | 3.2 ml |

TABLE 5

ECOM Formulation Example 1 with 30 lb/bbl Solids Contamination-
High Temperature Aging Results Hot-Rolled at 300° F. for 16 hours

| | |
|---|---|
| Electrical Stability: | 1 V |
| Electrical Conductivity @ 120° F.: | |
| static conditions | 1685 μs/cm |
| dynamic conditions | 1482–1526 μs/cm |
| Fann 35A @ 120° F. | |
| 600/300 rpm: | 156/127 |
| 200/100 rpm: | 116/179 |
| 6/3 rpm: | 41/25 |
| PV/YP | 29/98 |
| 10 s/10 min gels: | 7/10 |
| HTHP @ 250° F. | 8.2 ml |

Chemical Treatment
After Hot-Rolling at 300° F. for 16 hours 2 lb/bbl BDF-239
1 lb/bbl DEEPTREAT ™

| | |
|---|---|
| Electrical Stability: | 0 V |

TABLE 5-continued

ECOM Formulation Example 1 with 30 lb/bbl Solids Contamination-
High Temperature Aging Results

| | |
|---|---|
| Electrical Conductivity @ 120° F.: | |
| static conditions | 310 μs/cm |
| dynamic conditions | 347–369 μs/cm |
| Fann 35A @ 120° F. | |
| 600/300 rpm: | 99/58 |
| 200/100 rpm: | 42/25 |
| 6/3 rpm: | 3/2 |
| PV/YP: | 41/17 |
| 10 s/10 min gels: | 3/4 |

Table 6 presents the results of taking the formulation presented in Example 1 and contaminating it with eight percent by volume of low gravity solids and aging it at the temperature of 250° F. The subsequent treatment of the fluid was carried out in an effort to improve the conductivity of the fluid. Although the conductivity levels shown before treatment may not warrant such additives, this test illustrates how such properties may be enhanced if desired.

TABLE 6

ECOM Formulation Example 1 with 80 lb/bbl Solids Contamination
80 lb/bbl of Rev Dust Hot-Rolled at 250° F. for 16 hours

| | |
|---|---|
| Electrical Stability: | 0 V |
| Electrical Conductivity @ 120° F.: | |
| static conditions | 104 μs/cm |
| dynamic conditions | 3 μs/cm |
| Fann 35A @ 120° F. | |
| 600/300 rpm: | 123/65 |
| 200/100 rpm: | 47/28 |
| 6/3 rpm: | 7/5 |
| PV/YP: | 58/7 |
| 10 s/10 min gels: | 5/10 |
| HTHP @ 250° F.: | 5.6 ml |

Treatment After Hot-Rolling at
250° F. for 16 hours

Treatments, lb/bbl:

| | |
|---|---|
| EZ MUL ® NTE | 2 |
| RS 1100 ™ | 20 |
| Disponil SML ™ | 10 |
| Tap water | 15 |
| Electrical Stability: | 0 V |
| Electrical Conductivity @ 120° F.: | |
| static conditions | 430 μs/cm |
| dynamic conditions | 161–173 μs/cm |
| Fann 35A @ 120° F. | |
| 600/300 rpm: | 154/85 |
| 200/100 rpm: | 60/33 |
| 6/3 rpm: | 4/2 |
| PV/YP: | 69/16 |
| 10 s/10 min gels: | 3/5 |

Table 7 gives another fluid formulation and illustrates how this example ECOM's rheological properties are notably lower at 150° F. than they are at 120° F. The electrical conductivity properties of 200/3 refer to a 200 at static conditions and a 3 under dynamic conditions.

TABLE 7

ECOM Formulation Example 2 with 30 lb/bbl Solids Contamination
12.0 lb/gal formulation, 85/15 O/W ratio

| | |
|---|---|
| PETROFREE ® LV, bbl | 0.455 |
| 30% CaCl$_2$, bbl | 0.138 |
| EZ MUL ® NTE, lb/bbl | 4 |
| RS1100 ™ | 50 |
| Disponil SML ™ | 10 |
| DEEPTREAT ™, lb/bbl | 1 |
| DURATONE ® HT, lb/bbl | 2 |
| GELTONE ® II, lb/bbl | 2 |
| BARACARB 5, lb/bbl | 10 |
| Lime, lb/bbl | 0.5 |
| DF-01, lb/bbl | 3 |
| BAROID, lb/bbl | 97.69 |
| Rev Dust, lb/bbl | 30 |
| Hot-Rolled at 150° F. for 16 hours | |
| Fann 35A @ 120° F. | |
| 600/300 rpm: | 192/124 |
| 200/100 rpm: | 97/58 |
| 6/3 rpm: | 10/8 |
| PV/YP: | 68/56 |
| 10 s/10 min gels: | 8/8 |
| HTHP @ 200° F.: | 7.6 ml |
| Fann 35A @ 150° F. | |
| 600/300 rpm: | 66/36 |
| 200/100 rpm: | 25/13 |
| 6/3 rpm: | 2/1 |
| PV/YP: | 30/6 |
| 10 s/10 min gels: | 2/4 |
| μs/cm @ 150° F.: | 200/3 |

Table 8 provides another example ECOM formulation and illustrates the effect of different concentrations of the fluid loss control polymer DF-01 on the electrical conductivity and the fluid loss properties of this fluid. Conductivity is much greater for the fluid containing 6 lb/bbl of the polymer.

TABLE 8

ECOM Formulation Example 3 with 30 lb/bbl Solids Contamination
10.0 lb/gal formulation, 90/10 O/W ratio

| | |
|---|---|
| PETROFREE ® LV, bbl | 0.628 |
| 30% CaCl$_2$, bbl | 0.100 |
| EZ MUL ® NTE, lb/bbl | 4 |
| RS 1100 ™ | 40 |
| Disponil SML ™ | 8 |
| DEEPTREAT ™, lb/bbl | 1 |
| DURATONE ® HT, lb/bbl | 2 |
| GELTONE ® II, lb/bbl | 2 |
| BARACARB ® 5, lb/bbl | — |
| Lime, lb/bbl | 0.5 |
| DF-01, lb/bbl | 1.5 vs 6 |
| BAROID, lb/bbl | 117 |
| Rev Dust, lb/bbl | 30 |
| Hot-Rolled at 150° F. for 16 hours | |
| 1.5 lb/bbl DF-01 | |
| Fann 35A @ 150° F. (x 1.1~120° F.) | |
| 600/300 rpm: | 108/76 |
| 200/100 rpm: | 60/33 |
| 6/3 rpm: | 4/3 |
| PV/YP: | 32/44 |
| 10 s/10 min gels: | 5/7 |
| HTHP @ 200° F.: | 31.0 ml |
| μs/cm @ 150° F.: | 200/3 |
| 6.0 lb/bbl DF-01 | |
| Fann 35A @ 150° F. (x 2~120° F.) | |
| 600/300 rpm: | 111/74 |
| 200/100 rpm: | 56/34 |

TABLE 8-continued

ECOM Formulation Example 3 with 30 lb/bbl Solids Contamination
10.0 lb/gal formulation, 90/10 O/W ratio

| | |
|---|---|
| 6/3 rpm: | 5/4 |
| PV/YP: | 37/37 |
| 10 s/10 min gels: | 6/14 |
| HTHP @ 200° F.: | 16.0 ml |
| μs/cm @ 150° F.: | 1536/418–488 |

The surfactant DEEP-TREAT™, available from Halliburton Energy Services, Inc. in Houston, Tex., when present in small quantities, appears to promote stabilization of conductivity in ECOM systems. Its chemistry is known to promote static discharge in dielectric fluids. DEEP-TREAT™ is not always an effective means of viscosity reduction. Reduction of viscosity may best be achieved by increasing the concentration of EZ MUL® NTE. The addition of a small quantity of a fatty acid, such as oleic, readily reduces the viscosity of an ECOM by creating a 'tighter' and more traditional invert emulsion fluid. Such treatment must be carefully done, so as not to severely disrupt electrical conductivity. Treatment with oleic acid should preferably not exceed about 0.5–1.0 lb/bbl and conductivity should preferably be carefully monitored during such treatment. In the event of over treatment, conductivity may be restored by the addition of water or brine in most cases.

The fluid loss control additive DF-01 available from Halliburton Energy Services, Inc. in Houston, Tex. appears to have significant beneficial effects on the electrical conductivity of these fluids. However, over-treatment may result in excessive fluid viscosities at lower temperatures, which may only be readily reduced by dilution with the base fluid.

The foregoing description of the invention is intended to be a description of preferred embodiments. Various changes in the details of the described method and fluid can be made without departing from the intended scope of this invention as defined by the appended claims.

I claim:

1. A method for resistivity imaging a formation during drilling a wellbore in said formation with an electrically conductive oil-based drilling fluid, said fluid comprising a polar ester oil-base, a sorbitan ester derivative surfactant, and an ethoxylated sorbitan ester derivative surfactant, wherein said surfactants are in quantities sufficient to create micelles having enhanced concentration in the palisade layer for imparting electrical conductivity to said drilling fluid.

2. The method of claim 1 wherein said micelles in the palisade layer are packed sufficiently close to yield a rigid surfactant film.

3. The method of claim 1 wherein said fluid is prepared by formulating an invert emulsion comprising said base oil to which is added said ethoxylated sorbitan ester derivative followed by said sorbitan ester derivative.

4. The method of claim 1 wherein said emulsion comprises about 85 to about 95 volume percent ester and about 5 to about 15 volume percent brine.

5. The method of claim 4 wherein said ester comprises said ester base oil, said sorbitan ester derivative, and said ethoxylated sorbitan ester derivative.

6. The method of claim 1 wherein said sorbitan ester has the formula:

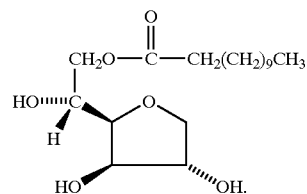

7. The method of claim 1 wherein said ethoxylated sorbitan ester has a formula the same as or similar to:

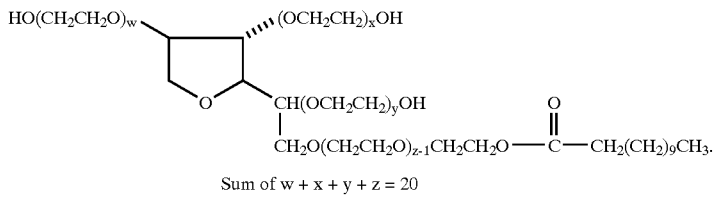

Sum of w + x + y + z = 20

8. The method of claim 1 wherein said sorbitan ester derivative and said ethoxylated sorbitan ester derivative are complimentary.

9. The method of claim 1 wherein said polar ester oil-base comprises a monocarboxylic acid ester of a $C_2$ to $C_{12}$ monofunctional alkanol.

10. A method far drilling a wellbore while resisitivity imaging the formation in which the wellbore is being drilled, said method comprising using an electrically conductive oil based drilling fluid, said fluid comprising complimentary fatty acid surfactants and a polar base oil for providing said electrical conductivity to said fluid.

11. The method of claim 10 wherein at least one of said complimentary fatty acid surfactants is more water soluble than the others and at least one of the other complimentary fatty acid surfactants is more oil soluble than the others.

12. The method of claim 10 wherein said complimentary fatty acid surfactants are selected from the group consisting of sorbitan esters, sorbitan ester derivatives, ethoxylated sorbitan esters, ethoxylated sorbitan ester derivatives, and combinations thereof.

13. A method for resistivity imaging a formation during drilling in said formation comprising providing an oil-base drilling fluid having complimentary surfactants that effect electrical conductivity through staggered arrangement of their micelles at the palisade layer.

14. The method of claim 13 wherein said complimentary surfactants provide an enhanced concentration of said micelles in the palisade layer.

15. The method of claim 13 further comprising resistivity imaging of said formation.

16. The method of claim 13 wherein said fluid effects said electrical conductivity over a broad temperature range.

17. The method of claim 13 wherein said surfactants are added to said oil in preparing said drilling fluid.

* * * * *